No. 737,957.

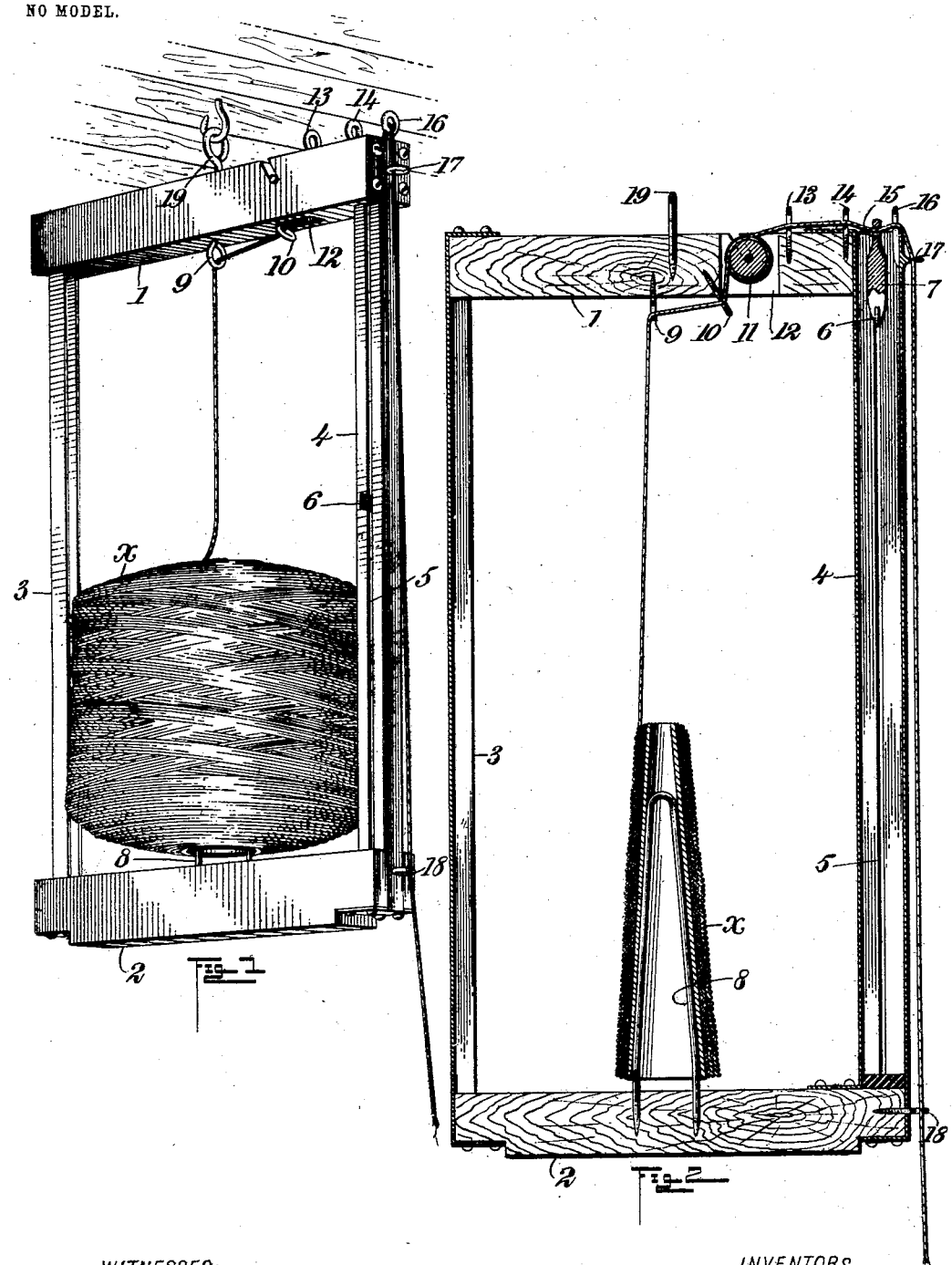

Patented September 1, 1903.

UNITED STATES PATENT OFFICE.

CORNELIUS LUCIUS PETERSON AND MARTIN ORLANDO THOMPSON, OF SIOUX FALLS, SOUTH DAKOTA.

TWINE-HOLDER.

SPECIFICATION forming part of Letters Patent No. 737,957, dated September 1, 1903.

Application filed April 4, 1903. Serial No. 151,062. (No model.)

*To all whom it may concern:*

Be it known that we, CORNELIUS LUCIUS PETERSON and MARTIN ORLANDO THOMPSON, citizens of the United States, and residents of Sioux Falls, in the county of Minnehaha and State of South Dakota, have invented a new and Improved Twine-Holder, of which the following is a full, clear, and exact description.

This invention relates to improvements in twine-holders, an object being to provide a twine-holder of simple construction designed to be suspended over a counter or the like and in which the twine will not become snarled or twisted.

We will describe a twine-holder embodying our invention and then point out the novel features in the appended claim.

Reference is to be had to the accompanying drawings, forming a part of this specification, in which similar characters of reference indicate corresponding parts in both the figures.

Figure 1 is a perspective view of a twine-holder embodying our invention, and Fig. 2 is a sectional elevation thereof.

The frame of the twine-holder comprises a top bar 1, a bottom bar 2, and side bars 3 4. The parts 1 2 may be made of wood and the bars 3 4 of suitable metal. The bar 3 is here shown as made of angle metal, and the bar 4 is made in the form of a boxing open at the top and having slots 5 in its opposite walls for receiving and guiding the wings 6 of a tension-weight 7.

Extended upward from the bottom bar 2 is a standard 8, upon which a ball of twine $x$ is designed to be placed. This standard as here shown is in the form of a wire loop. The cord from the ball passes up through guide-eyes 9 10, attached to the under side of the bar 1, and thence over a roller 11, arranged in an opening 12, formed in said top bar. The journals of these rollers have bearings in the side walls of the opening 12, and these bearings open outward, as clearly indicated in the drawings, so that the roller may be readily removed for convenience in placing a new ball of twine in the holder. From the roller 11 the twine passes through guide-eyes 13 14 on the upper side of the bar 1 and thence through an eye 15 in the upper end of the weight 7, from which it passes through a guide-eye 16, extended upward from the box-like bar 4, and thence down through guide-eyes 17 18, arranged, respectively, at the upper and lower portions of said bar 4.

The bar 1 is provided with an eye 19, that may be attached to a hook in a ceiling or to a chain or the like suspended from the ceiling.

In the operation when the cord is drawn out for tying a bundle or package the tension-weight 7 will be drawn to the upper end of the box-like bar 4, and then after severing the cord the end will be drawn upward by the weight 7 moving downward. Of course the length of movement of this weight 7 will be sufficient only to move the end of the cord to a point above the counter where it will be out of the way, but yet in easy reach.

Having thus described our invention, we claim as new and desire to secure by Letters Patent—

A twine-holder, comprising a frame having a hollow side member open at the top, a tension-weight in said hollow member and having an eye through which the twine may pass, guide-eyes in the under side of the top member of the frame, a roller removably placed in said top member, guide-eyes above and at opposite sides of the hollow side member, a guide-eye near the upper end of said hollow side member, and an eye at the lower end of said member.

In testimony whereof we have signed our names to this specification in the presence of two subscribing witnesses.

CORNELIUS LUCIUS PETERSON.
MARTIN ORLANDO THOMPSON.

Witnesses:
ED C. ZIMMERMAN,
T. CHAS. SHIPLEY.